United States Patent [19]
Toyoshima et al.

[11] Patent Number: 5,702,545
[45] Date of Patent: Dec. 30, 1997

[54] PNEUMATIC RADIAL TIRE HAVING ASYMMETRIC TREAD PATTERN

[75] Inventors: Takayuki Toyoshima; Eiichi Iida, both of Hiratsuka, Japan

[73] Assignee: The Yokohama Rubber Co., Ltd., Tokyo, Japan

[21] Appl. No.: 722,665

[22] Filed: Sep. 30, 1996

Related U.S. Application Data

[63] Continuation of Ser. No. 356,537, Dec. 15, 1994, abandoned.

[30] Foreign Application Priority Data

Dec. 27, 1993 [JP] Japan .................................. 5-333442

[51] Int. Cl.$^6$ .................................................. B60C 111/00
[52] U.S. Cl. ............................................................ 152/209 A
[58] Field of Search .......................... 152/209 R, 209 A, 152/209 D; D12/146, 147, 148

[56] References Cited

U.S. PATENT DOCUMENTS

| | | | |
|---|---|---|---|
| 4,785,863 | 11/1988 | Tsuda et al. | 152/209 A |
| 5,002,109 | 3/1991 | Shepler et al. | 152/209 A |
| 5,291,929 | 3/1994 | Daisho et al. | 152/209 R |
| 5,425,406 | 6/1995 | Swift et al. | 152/209 A |

FOREIGN PATENT DOCUMENTS

| | | | |
|---|---|---|---|
| 3924017 | 3/1990 | Germany | 152/209 R |
| 175303 | 7/1990 | Japan | 152/209 D |
| 215504 | 8/1992 | Japan | 152/209 D |

OTHER PUBLICATIONS

"Yokohama, Pirelli debut all–season UHP radials", Tire Review, Dec. 1988, p. 10.
"Tire Talk", Tire Review, Nov. 1989, p. 6.

*Primary Examiner*—Steven D. Maki
*Attorney, Agent, or Firm*—Nikaido, Marmelstein, Murray & Oram LLP

[57] ABSTRACT

A large number of sub-grooves inclining in the same direction as a tire rotating direction of a tire circumferential direction towards the outside of a car and extending in a tire width-wise direction are disposed on a tread surface of a tire the tire rotating direction of which is designated in one direction, and at least one main groove extending straight in the tire circumferential direction is disposed in an inside region of the tread surface inner than a tire center line. Further, semi-main grooves crossing the sub-grooves and inclining in an opposite direction to that of the sub-grooves are disposed at a predetermined pitch in the tire circumferential direction in an outside region of the tread surface outer than the tire center line. In this way, a pneumatic radial tire of the present invention has a block type tread pattern having asymmetric directionality.

8 Claims, 2 Drawing Sheets

5,702,545

PNEUMATIC RADIAL TIRE HAVING ASYMMETRIC TREAD PATTERN

This application is a continuation of application Ser. No. 08/356,537 filed Dec. 15, 1994, now abandoned.

BACKGROUND OF THE INVENTION

This invention relates to a pneumatic radial tire having a block type tread pattern of asymmetric directionality. More particularly, the present invention relates to a pneumatic radial tire which will be particularly suitable for a passenger car by improving both drain performance at the time of turning on a wet road surface and steering stability on a dry road surface in a block type tread pattern having asymmetric directionality.

A block type pattern tread having asymmetric directionality is used for improving drain performance at the time of turning particularly on a wet road in a pneumatic radial tire for passenger cars. In this pattern, a plurality of linear main grooves 12 are disposed on a tread surface 11 in such a manner as to extend in a tire circumferential direction T as shown in FIG. 2, for example, and a plurality of sub-grooves 13 are so provided to these main grooves 12 as to incline in the same direction in a tire width-wise direction and to form a large number of blocks 14 in cooperation with the main grooves. An arrow R indicates a tire rotating direction.

As described above, the block type tread pattern having asymmetric directionality has excellent drain performance at the time of turning of the car on a wet road surface. However, it involves the problem that steering stability drops on a dry road surface, on the contrary.

SUMMARY OF THE INVENTION

In a pneumatic radial tire having a block type tread pattern having asymmetric directionality, the present invention aims at providing a pneumatic radial tire which improves drain performance at the time of turning on a wet road surface as well as dry road steering stability.

To accomplish the object described above, the present invention provides a pneumatic radial tire having a block type tread pattern having asymmetric directionality, wherein a large number of sub-grooves slantingly extending in a tire width-wise direction towards the outside of a car and in the same direction as a tire rotating direction of a tire circumferential direction are disposed on a tread surface of a tire the rotating direction of which is designated in one direction, at least one main groove extending straight in the tire circumferential direction is disposed in an inside region of the tread surface inner than a tire center line when the tire is fitted to the car, and semi-main grooves crossing the sub-grooves and inclining in the tire circumferential direction in an opposite direction to that of the sub-grooves are disposed in an outside region of the tread surface outer than the tire center line at a predetermined pitch.

In the pneumatic radial tire having such a block type tread pattern having asymmetric directionality, at least one straight main groove is disposed in the tire circumferential direction in the inside region of the tread surface inner than the tire center line when the tire is fitted to the car, and a plurality of semi-main grooves inclining in the opposite direction to that of the sub-grooves and inclining towards the tire center in the tire rotating direction are so disposed in the outside region as to cross the sub-grooves. Accordingly, turning-drain property at the time of driving on the wet road surface can be improved and at the same time, rigidity of the blocks defined by the semi-main grooves and the sub- grooves and resisting the centrifugal force during turning can be improved, at the time of turning on the dry road surface. Accordingly, steering stability can be improved.

DESCRIPTION OF THE PREFERRED EMBODIMENT

Figure 1:
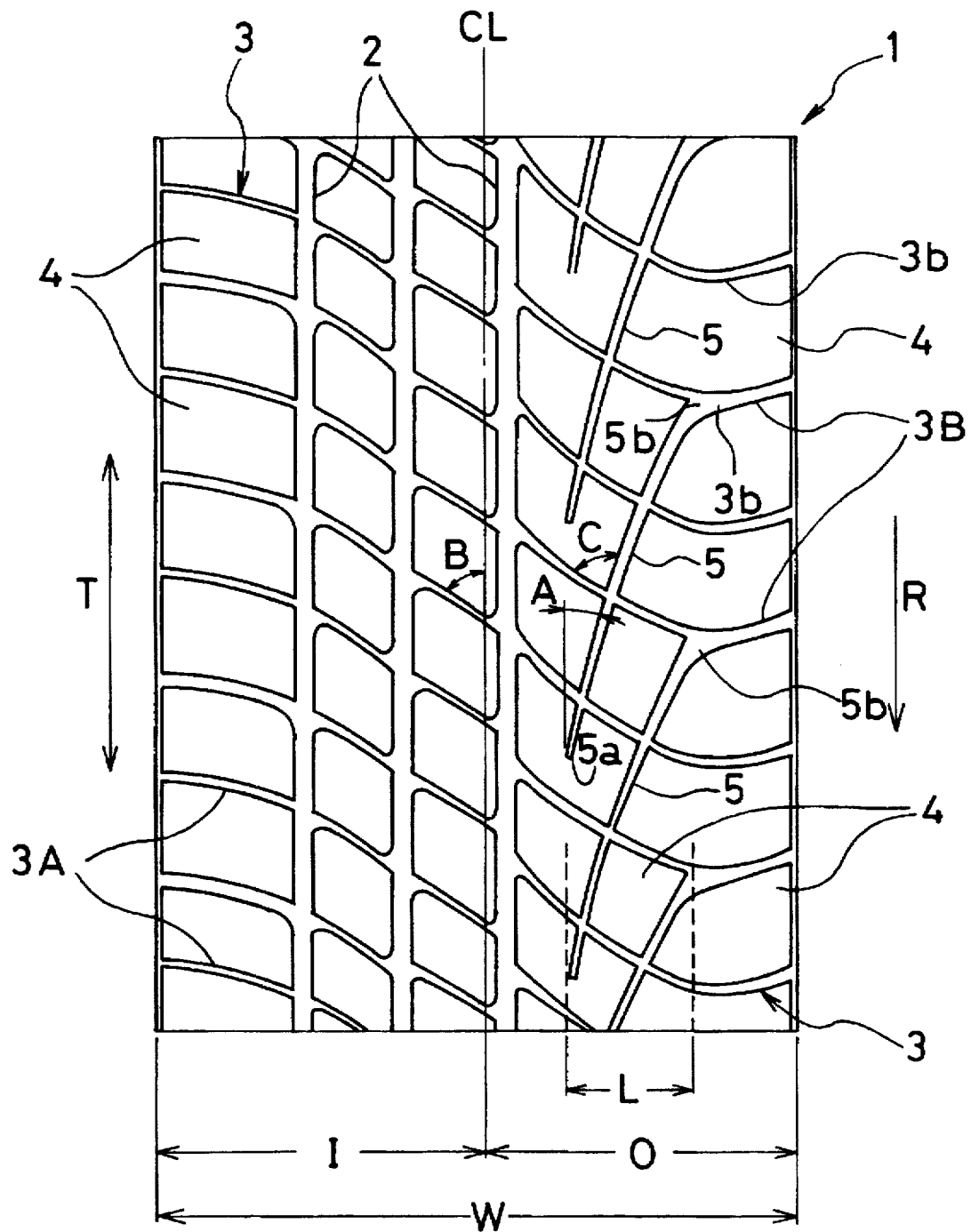
FIG. 1 is an exploded view showing an example of a principal portion of a block type tread pattern having asymmetric directionality in a pneumatic radial tire according to the present invention.

In FIG. 1, the pneumatic radial tire according to the present invention is designated so that the rotating direction of the tire lies in the direction indicated by R when it is fitted to a car. When the tire is fitted to the car, an inside region I of a tread surface 1 exists on the left-hand side from a tire center line CL and its outside region O exists on the right-hand side.

A large number of sub-grooves 3 are disposed on such a tread surface 1 in such a manner that they incline towards the outside of the car in the same direction with respect to the tire rotating direction R in the tire circumferential direction T and extend in a tire width-wise direction. Two main grooves 2 extending straight in the tire circumferential direction are disposed in the inside region I of the tread surface 1 provided with these sub-grooves 3. One main groove 2 is disposed near the center line CL in the outside region O of the tread surface 1, and a plurality of semi-main grooves 5 inclining in the opposite direction to that of the sub-grooves 3 with respect to the tire circumferential direction T in other main zones of the outside region O in such a manner as to cross the sub-grooves 3. A large number of blocks 4 are defined by these main grooves 2, sub-grooves 3 and semi-main grooves 5.

Each sub-groove 3 comprises an inside sub-groove portion 3A which extends from the main groove 2 near the center line CL, transversely crosses the full zone of the inside region I and continuously communicates, and an outside sub-groove portion 3B which extends from the main groove 2 near the center line CL, transversely crosses the full zone of the outside region O and continuously communicates. The inside sub-groove portion 3A and the outside sub-groove portion 3B need not always communicate with each other on the main groove 2 near the center line CL, and a part, or the whole, of them may be step-like as in the example shown in the drawing.

However, the inside sub-groove portion 3A must be a continuous groove from near the center line CL to the shoulder end portion of the inside region I, and the outside sub-groove portion 3B must be a continuous groove from near the center line CL to the shoulder end portion of the outside region O.

In the embodiment shown in the drawing, the inside sub-groove portion 3A, extending slantingly to the opposite rotating direction of the tire as it extends to the edge side of the inside region I, is shaped into a substantially linear shape in a region interposed by the main grooves 2 and is shaped into a curved shape, which is recessed with respect to the tire rotating direction R, at the shoulder portion. On the other hand, the outside sub-groove portion 3B is shaped into a curved shape which protrudes with respect to the tire rotating direction R. The portion of the sub-groove portion 3B inner than the protrusive apex portion 3b inclines in the same direction as the inside sub-groove portion 3A but the portion on the tire outer side inclines in the same inclining direction as the semi-main grooves 5.

Each semi-main groove 5 is disposed with a large radius of curvature so that it inclines towards the center line CL with respect to the tire rotating direction R. These semi-main grooves 5 are disposed with a predetermined pitch which variably changes in the tire circumferential direction T, and those semi-main grooves which are adjacent to one another in the tire circumferential direction T are disposed in such a manner that they partially overlap with one another in the tire width-wise direction.

In FIG. 1, the distal end 5a of each semi-main groove 5 in the tire rotating direction is shown positioned at the center of the block 4. Each semi-main groove 5 is slantingly extended from this center portion in a direction opposite to the tire rotating direction towards the outer side of the tire, and crosses three sub-grooves 3. Then, its rear end 5b is connected to the protrusive apex portion 3b of the fourth sub-groove 3. Because the semi-main grooves 5 are disposed in the way described above, the rear end 5b of each semi-main groove 5 is connected to every other sub-grooves 3.

The portion of the sub-groove 3 from the protrusive apex portion 3b, to which the rear end 5b of each semi-main groove 5 is connected, to the tire outer edge has a groove width which is greater than those of the rest of the sub-groove so that water guided into the semi-main groove 5 can be smoothly discharged to the tire outside.

The semi-main groove 5 in the present invention is defined by the positions of disposition described above but is not particularly defined by the width and depth of the groove. In FIG. 1, for example, the main groove 2 has the greatest width, then the semi-main groove 5, and the sub-groove 3 has the smallest groove width.

In the construction described above, only the straight main grooves 2 are disposed in the inside region I of the tread 1 in the present invention. The number of main grooves 2 disposed in this inside region I is at least one. However, this main groove 2 need not always be disposed in the outside region O of the tread 1. The semi-main grooves 5 must be primarily disposed in this outside region O.

As described above, in the block type tread pattern having asymmetric directionality wherein the sub-grooves are so disposed as to incline towards the outer side of the car in the tire rotating direction when the tire is fitted to the car, the present invention so disposes a plurality of semi-main grooves 5 inclining in the opposite direction to the tire circumferential direction T in the outside region O of the tread 1 as to cross the sub-grooves 3. Accordingly, the drain effect at the time of turning on a wet road surface can be improved much more over the conventional tire shown in FIG. 2. Rigidity of the blocks 4 defined by the semi-main grooves 5 and the sub-grooves in the outside region O of the tread 1 becomes maximal resisting the centrifugal force at the time of turning on a dry road surface and consequently, dry road steering stability can be improved. Because the semi-main grooves 5 are inclined with respect to the tire circumferential direction, wandering property of the rain grooves can also be improved.

In the block type tread pattern having asymmetric directionality described above, the angle A of inclination of the semi-main groove 5 on the acute angle side with respect to the tire circumferential direction T (an angle between a tangent drawn on the semi-main groove 5 when the semi-main groove 5 is curved and the tire circumferential direction T) preferably satisfies the relation $5° \leq A \leq 32°$. When the angle A of inclination is smaller than 5°, the effect of improvement in steering stability on the dry road surface cannot be recognized and when it is greater than 32°, straight movement-drain property on the wet road surface drops.

The angle B of inclination of the sub-groove 3 (the sub-groove existing between the main groove 1 on the innermost side of the tire and the semi-main groove 5 crossing on the outermost side of the tire) on the acute angle side with respect to the tire circumferential direction T (angle between a tangent drawn on the sub-groove 3 and the tire circumferential direction T when the sub-groove 3 is curved) preferably satisfies the relation $30° \leq B \leq 70°$. When the angle B of inclination is less than 30°, steering stability on the dry road surface gets deteriorated and when it exceeds 70°, straight movement-drain property drops on the wet road surface.

The crossing angle C between the sub-groove 3 and the semi-main groove 5 while interposing the tire circumferential direction between them (when sub-groove 3 and semi-main groove 5 are curved, the angle between the tangents drawn on the sub-groove 3 and semi-main groove 5, respectively) is preferably set so as to satisfy the relation $0° \leq C \leq 95°$ at the point of intersection of the sub-groove 3 and the semi-main groove 5 in order to simultaneously improve the turning drain property on the wet road surface and steering stability on the dry road surface.

Further, the ratio between the length L of the semi-main groove 5 in the tire width-width direction and a tread expansion width W is preferably so set as to satisfy the relation $0.4 \leq 2L/W \leq 1.0$. When the ratio 2L/W is less than 0.4 or exceeds 1.0, straight movement-drain property drops.

In the present invention, when the main grooves 2 are disposed in the outside region O, the semi-main grooves 5 may communicate with the main grooves 2 within the range which block rigidity permits. The arrangement pitch of the sub-grooves 3 or the blocks 4 in the tire circumferential direction T need not always be the same but may be different.

EXAMPLE 1

Figure 2:
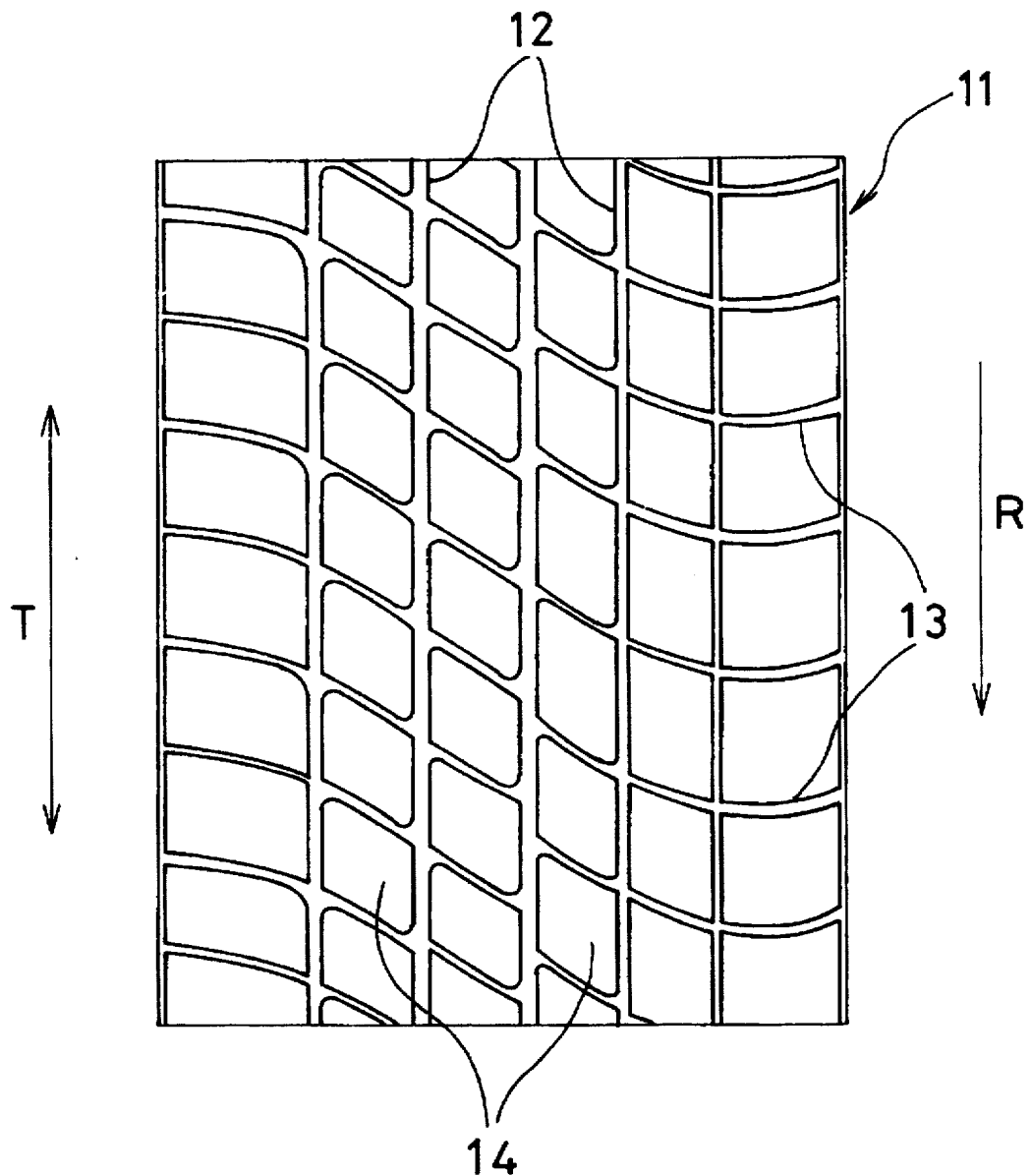
FIG. 2 is an exploded view showing an example of a principal portion of a block type tread pattern having asymmetric directionality in a pneumatic radial tire according to the prior art.

A tire according to the present invention having a common tire size of 225/50R16, and an inclination angle A of 20° for the semi-main groove, an inclination angle B of 50° for the sub-groove, a crossing angle C of 70° for the semi-main groove and the sub-groove and a ratio 2L/W =0.7 in the block type tread pattern of asymmetric directionality shown in FIG. 1 was produced, and a conventional tire having a block type tread pattern of asymmetric directionality shown in FIG. 2 and having the same angle of inclination of the sub-groove was produced, respectively.

Each of the test tires was fitted to a rim having a rim size of 16×7JJ, and evaluation tests were carried out so as to evaluate turning/drain property on the wet road surface and dry road steering stability. The results obtained are tabulated in Table 1.

Turning/drain property:

Each test tire was set to a pneumatic pressure of 2.2 kg cm$^2$ and was fitted to a passenger car. On a wet road surface, a driving speed was increased on a flat ground having a mean water depth of 4 mm while describing a circle having a radius of 30 m, and the occurrence speed of hydroplaning was measured. The evaluation results were indicated by indices using the values of the conventional tire as 100. The greater the index values, the more excellent the turning-drain property.

Steering stability:

A test car was driven on the dry road surface of a slalom test course on which pylons were planted with predetermined intervals, and steering stability was evaluated by an average speed. The result was indicated by index values using the value of the conventional tire as 100. The greater the index values, the higher steering stability.

TABLE 1

|  | The present tire | Conventional tire |
| --- | --- | --- |
| turning/drain property | 103 | 100 |
| dry road steering stability | 104 | 100 |

As can be clearly seen from Table 1, both turning/drain property and steering stability were improved in the tire according to the present invention.

EXAMPLE 2

Turning/drain property on the wet road surface and steering stability on the dry road surface were tested and evaluated under the same condition of measurement as described above with the inclination angle A, the inclination angle B, the crossing angle C and the ratio 2L/W changed as tabulated in Tables 2 to 5. And an evaluation test of straight movement-drain property on the wet road surface was carried out on the wet road. The results were tabulated in Tables 2 to 5. The values in these Tables were indicated by the value of the present tire shown in Table 1 as 100 as the index value.

Straight movement-drain property:

The test tire was set to a pneumatic pressure of 2.2 kg/cm$^2$ and was fitted to a passenger car. The critical speed at which hydroplaning occurred was measured, and performance was evaluated by the index value. The greater the index value, the higher straight movement-drain property.

TABLE 2

|  | test tire 1 | test tire 2 | test tire 3 | test tire 4 | test tire 5 |
| --- | --- | --- | --- | --- | --- |
| A(°) | 3 | 5 | 20 | 32 | 40 |
| turning-drain property | 96 | 98 | 100 | 101 | 100 |
| dry road steering stability | 90 | 97 | 100 | 98 | 96 |
| straight movement-drain property | 102 | 100 | 100 | 98 | 96 |

Remarks: constant at B = 50° C., C = 70°, 2L/W = 0.7.

TABLE 3

|  | test tire 6 | test tire 7 | test tire 8 | test tire 9 | test tire 10 |
| --- | --- | --- | --- | --- | --- |
| B(°) | 20 | 30 | 50 | 70 | 80 |
| turning-drain property | 97 | 100 | 100 | 101 | 101 |
| dry road steering | 94 | 97 | 100 | 98 | 96 |

TABLE 3-continued

|  | test tire 6 | test tire 7 | test tire 8 | test tire 9 | test tire 10 |
| --- | --- | --- | --- | --- | --- |
| stability straight movement-drain property | 101 | 100 | 100 | 98 | 96 |

Remarks: constant at A = 20° C., C = 50°, 2L/W = 0.7.

TABLE 4

|  | test tire 11 | test tire 12 | test tire 13 | test tire 14 | test tire 15 |
| --- | --- | --- | --- | --- | --- |
| C(°) | 40 | 50 | 70 | 95 | 100 |
| turning-drain property | 97 | 100 | 100 | 99 | 96 |
| dry road steering stability | 95 | 97 | 100 | 97 | 96 |
| straight movement-drain property | 101 | 100 | 100 | 99 | 97 |

Remarks: constant at A = 20° C., C = 50°, 2L/W = 0.7.

TABLE 5

|  | test tire 16 | test tire 17 | test tire 18 | test tire 19 | test tire 20 |
| --- | --- | --- | --- | --- | --- |
| 2L/W | 0.3 | 0.4 | 0.7 | 1.0 | 1.1 |
| turning-drain property | 96 | 98 | 100 | 102 | 102 |
| dry road steering stability | 99 | 100 | 100 | 100 | 101 |
| straight movement-drain property | 101 | 101 | 100 | 99 | 96 |

Remarks: constant at A = 20° C., B = 50°, C = 70°.

As can be clearly seen from Tables 2 to 5, it is preferable to set the inclination angle A to 5° to 32°, the inclination angle B to 30° to 70°, the crossing angle C to 50° to 95° and the ratio 2L/W to 0.4 to 1.0. The tire having the evaluation value of at least 97 could keep a good condition in both turning/drain property and steering stability.

As described above, according to the present invention in the block type tread pattern having asymmetric directionality wherein the sub-grooves on the tread surface are inclined towards the outside of the car with respect to the tire rotating direction when the tire is fitted to the car, a plurality of semi-main grooves are disposed inclining in the opposite direction to the inclination of the sub-grooves in the outside region in a predetermined pitch in the tire circumferential direction, and causes these semi-main grooves to cross the sub-grooves. Accordingly, the present invention can improve both drain property at the time of turning on the wet road surface and steering stability on the dry road surface.

What is claimed is:

1. A pneumatic radial tire designed to rotate in one rotating direction comprising a tread having a tread surface and including a large number of first sub-grooves continuously extending in a tire width-wise direction from near a tire center line to a first side of the tire, said first sub-grooves being convexly curved relative to the one rotating direction, only two main grooves extending straight in the tire circumferential direction in a first region of the tread surface defined between the tire center line and a second side of the tire opposite said first side, only one main groove disposed in the vicinity of the tire center line in a second region of the tread surface defined extending axially outwardly of the tire center line relative to the first region, a large number of second sub-grooves extending from said only one main groove continuously in a tire width-wise direction to said second side at an acute angle B to a tire circumferential direction, said second sub-grooves being concavely curved relative to the one rotating direction, and semi-main grooves inclining in the tire circumferential direction in an opposite direction to that of said second sub-grooves only in said second region of the tread surface at a predetermined pitch, so as to form a block tread pattern having asymmetric directionality, each semi-main groove having a leading end in the one rotating direction terminating in a central portion of one block of the tread, each semi-main groove being curved at a large curvature, each semi-main groove crossing three of said first sub-grooves, each semi-main groove having a trailing end in the one rotating direction terminating in a fourth one of said first sub-grooves at an apex, said semi-main grooves terminating in alternating first sub-grooves, an inclination angle A of said semi-main grooves to the tire circumferential direction on an acute angle side being from about 5° to about 32°, each of said first sub-grooves having a portion closest to said first side being inclined at a sub-groove angle in a same direction as said inclination angle A, said portion of said first sub-groove having a width wider than a width of the remainder of said first sub-groove, and a groove width of each of said semi-main grooves being the largest at said trailing end.

2. A pneumatic radial tire according to claim 1, wherein said acute angle B of said second sub-grooves to the tire circumferential direction, a crossing angle C defined between said semi-main grooves and said first sub-grooves, a length L of said semi-main grooves in the tire width-wise direction and a tread expansion width W satisfy the following relations, respectively:

$30° \leq B \leq 70°$ $50° \leq C \leq 95°$ $0.4 \leq 2L/W \leq 1.0$.

3. A pneumatic radial tire according to claim 1, wherein a groove width of each main groove is larger than said groove width of each semi-main groove which in turn is larger than said width of either of said first or second sub-grooves.

4. A pneumatic radial tire according to claim 1, wherein said sub-grooves are provided at a different pitch.

5. A pneumatic radial tire according to claim 4, wherein said semi-main grooves are provided at a variable pitch.

6. A pneumatic radial tire according to claim 1, wherein said sub-groove angle is larger than said inclination angle A.

7. A pneumatic radial tire according to claim 6, wherein at said largest groove width of said semi-main groove, only one groove wall of said semi-main groove is arcuately curved, said one groove wall being the groove wall closest to the first side.

8. A pneumatic radial tire according to claim 7, wherein said semi-main grooves are provided at a variable pitch.

* * * * *